(12) United States Patent
Tzikas et al.

(10) Patent No.: US 7,030,229 B2
(45) Date of Patent: Apr. 18, 2006

(54) ANTHRAQUINONE-AZO DYES

(75) Inventors: Athanassios Tzikas, Pratteln (CH);
Antoine Clément, Basel (CH); Urs Lauk, Zürich (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 33 days.

(21) Appl. No.: 10/516,440

(22) PCT Filed: May 27, 2003

(86) PCT No.: PCT/EP03/05562

§ 371 (c)(1),
(2), (4) Date: Nov. 30, 2004

(87) PCT Pub. No.: WO03/102083

PCT Pub. Date: Dec. 11, 2003

(65) Prior Publication Data

US 2005/0182247 A1 Aug. 18, 2005

(30) Foreign Application Priority Data

Jun. 3, 2002 (EP) .................................. 02405444

(51) Int. Cl.
*C09B 56/12* (2006.01)
*G02B 5/20* (2006.01)
*C08K 5/23* (2006.01)
(52) U.S. Cl. .................. 534/655; 524/99; 524/102
(58) Field of Classification Search ................ 534/655; 524/99, 102
See application file for complete search history.

(56) References Cited

U.S. PATENT DOCUMENTS

| | | | | |
|---|---|---|---|---|
| 3,998,802 | A | 12/1976 | Dehnert et al. | 260/156 |
| 4,146,535 | A | 3/1979 | Dehnert et al. | 260/156 |
| 4,150,943 | A * | 4/1979 | Dehnert et al. | 8/611 |
| 4,515,716 | A * | 5/1985 | Niwa et al. | 534/635 |
| 5,367,039 | A | 11/1994 | Yabuuchi et al. | 526/284 |
| 5,624,467 | A | 4/1997 | Texter et al. | 23/295 |
| 6,180,315 | B1 | 1/2001 | Schadeli et al. | 430/200 |
| 2004/0040099 | A1 | 3/2004 | Sutter et al. | 8/643 |

FOREIGN PATENT DOCUMENTS

| | | |
|---|---|---|
| GB | 1461899 | 1/1977 |
| GB | 2182165 | 5/1987 |
| WO | 98/45756 | 10/1998 |

OTHER PUBLICATIONS

K. Tsuda, Displays, vol. 14, No. 2, (1993), pp. 115-124.

* cited by examiner

Primary Examiner—Fiona T. Powers
(74) Attorney, Agent, or Firm—Kevin T. Mansfield

(57) ABSTRACT

The present invention relates to an azo dye of formula I, II or III: (formula I, II or III); wherein $R_1$ and $R_2$ are each independently of the other one or more divalent groups selected from alkylene, arylene, aralkylene and cycloalkylene, which may be interrupted by —O—, —S—, —NH—, —NR$_8$—, —COO—, —CONH— or —CONR$_9$—, wherein $R_8$ and $R_9$ are alkyl or aryl, X is —O— or —NH—, $R_3$ is —CN or —CONH$_2$, $R_4$ is methyl or trifluoromethyl and $R_5$, $R_6$, $R_7$ and $R_8$ are each independently of the others hydrogen, halogen or —CN, to a process for the preparation thereof and to the use thereof in a method of producing mass-colored plastics or polymeric color particles.

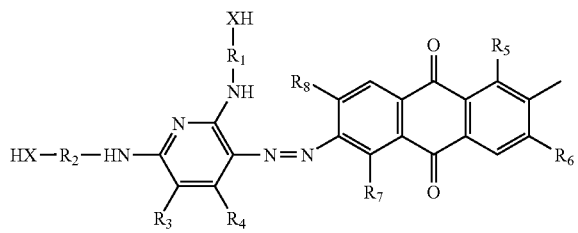

(I)

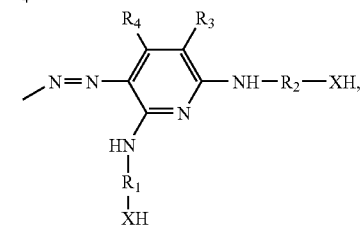

(II)

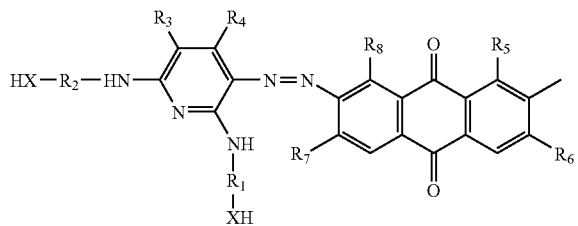

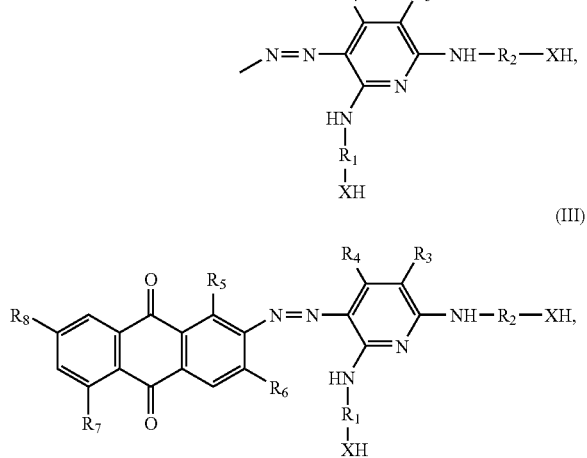

(III)

11 Claims, No Drawings

ANTHRAQUINONE-AZO DYES

The present invention relates to novel azo dyes, to a process for the preparation thereof, and to the use thereof in a method of producing mass-coloured plastics or polymeric colour particles and as colorants in the production of colour filters.

Dyes for mass-colouring plastics are known. For example, there are described in U.S. Pat. No. 5,367,039 1,4,5,8-tetrasubstituted anthraquinones having (meth)acryloyl groups which can be copolymerised with vinyl monomers and are thus suitable for the production of coloured vinyl polymers.

The dyes used until now do not, however, meet the highest requirements in terms of light fastness and, especially, thermostability.

There is accordingly a need for novel thermostable dyes that produce colorations having a high tinctorial strength and exhibiting light fastness, especially high-temperature light fastness, and that have good all-round fastness properties.

U.S. Pat. No. 3,998,802 discloses 2,6-diaminopyridine-based azo dyes that are suitable for colouring synthetic polyamides and polyesters according to the exhaust process and that are distinguished by good properties of fastness to heat setting and to light.

It has now, surprisingly, been found that specific 2,6-diaminopyridine-based azo dyes are suitable for mass-colouring synthetic polymers, yield colorations having a high tinctorial strength and exhibiting light fastness, especially high-temperature light fastness, and have good all-round fastness properties.

The present invention relates to an azo dye of formula I, II or III wherein $R_1$ and $R_2$ are each independently of the other one or more divalent groups selected from alkylene, arylene, aralkylene and cycloalkylene, which may be interrupted by —O—, —S—, —NH—, —$NR_8$—, —COO—, —CONH— or —$CONR_9$—, wherein $R_8$ and $R_9$ are alkyl or aryl, X is —O— or —NH—, $R_3$ is —CN or —$CONH_2$, $R_4$ is methyl or trifluoromethyl and $R_5$, $R_6$, $R_7$ and $R_8$ are each independently of the others hydrogen, halogen or —CN.

The substituents $R_1$ and $R_2$ may be identical or different; preferably, $R_1$ and $R_2$ are identical.

Any radical denoting alkyl may be a straight-chain or branched alkyl radical having preferably from 1 to 12 carbon atoms that may be substituted by one or more hydroxy groups, amino groups or halogen atoms.

Examples of alkyl groups include methyl, ethyl, n-propyl, isopropyl, n-butyl, isobutyl, sec-butyl, tert-butyl, n-pentyl, isopentyl, neopentyl, n-hexyl, n-heptyl, n-octyl, isooctyl, n-decyl and n-dodecyl.

Substituted alkyl groups include, for example, 2-hydroxyethyl, 2-hydroxypropyl, 4-hydroxybutyl, 2-aminoethyl, 2-aminopropyl, 4-aminobutyl, 2-chloroethyl, 2-bromoethyl and 4-chlorobutyl.

Aryl groups as $R_8$ or $R_9$ have preferably from 5 to 24, especially from 6 to 14, carbon atoms and may be substituted, for example, by $C_1$–$C_4$alkyl, $C_1$–$C_4$alkoxy, halogen or by the radical —NH—CO—R wherein R is amino, $C_1$–$C_4$alkyl, unsubstituted phenyl or phenyl substituted by $C_1$–$C_4$alkyl, $C_1$–$C_4$alkoxy or by halogen.

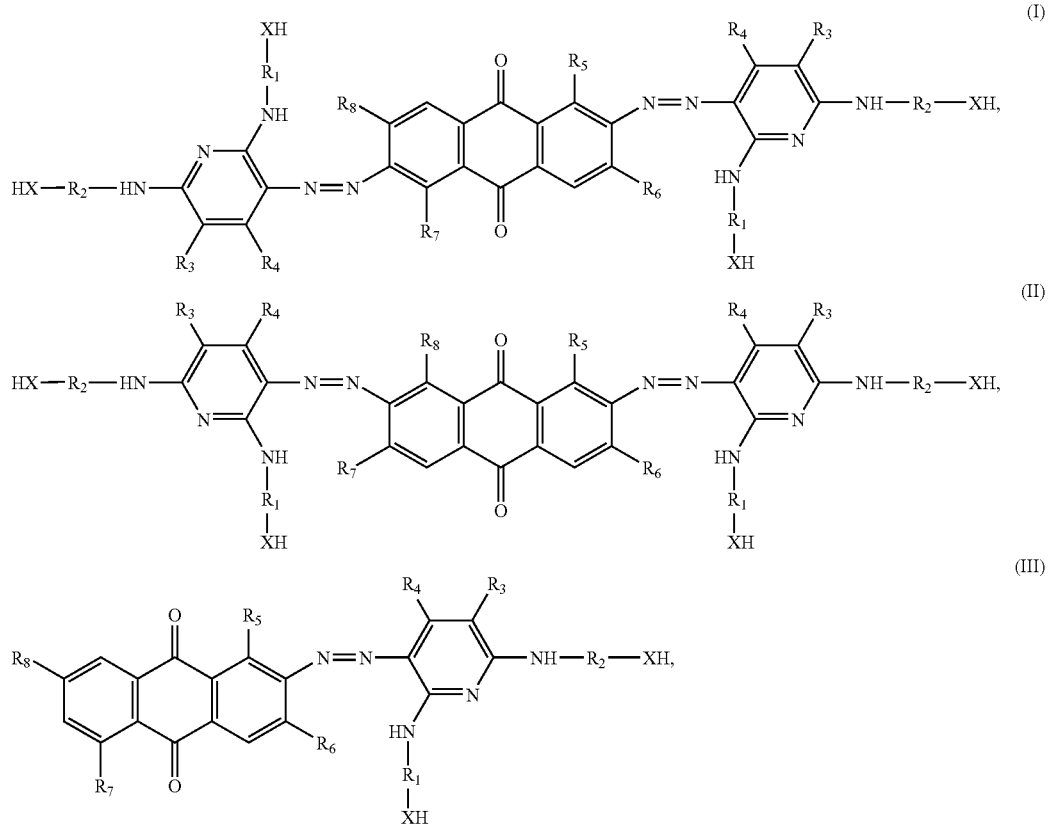

Examples of suitable aryl groups include phenyl, tolyl, mesityl, isityl, 2-hydroxyphenyl, 4-hydroxyphenyl, 2-chlorophenyl, 4-chlorophenyl, 2-aminophenyl, 3-aminophenyl, 4-aminophenyl, 4-methoxyphenyl, 4-ethoxyphenyl, 4-acetylaminophenyl, naphthyl and phenanthryl.

When one of the divalent radicals $R_1$ or $R_2$ is alkylene, it is preferably a $C_1$–$C_6$alkylene group, for example ethylene, propylene, trimethylene, tetramethylene or hexamethylene.

Alkylene groups interrupted by —O— or —NH— may be poly(oxyethylene), poly(oxypropylene), poly(aminoethylene) and poly(oxypropylene), for example —(OCH$_2$CH$_2$)$_n$—, —(OCHCH$_3$CH$_2$)$_n$—, —(NHCH$_2$CH$_2$)$_n$—, —(NHCHCH$_3$CH$_2$)$_n$—, wherein n is a number from 1 to 10.

Examples of arylene groups include 1,2-, 1,3- and 1,4-phenylene, toluene-2,4-diyl, toluene-2,5-diyl, toluene-2,6-diyl, naphthalene-1,4-diyl, naphthalene-1,5-diyl and naphthalene-1,8-diyl.

Aralkylene groups are, for example, groups of the following formulae:

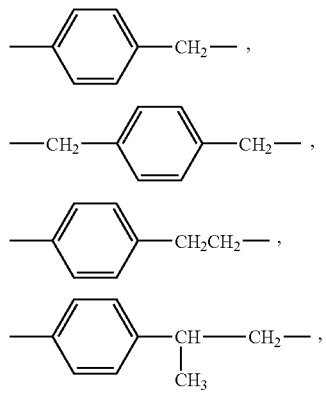

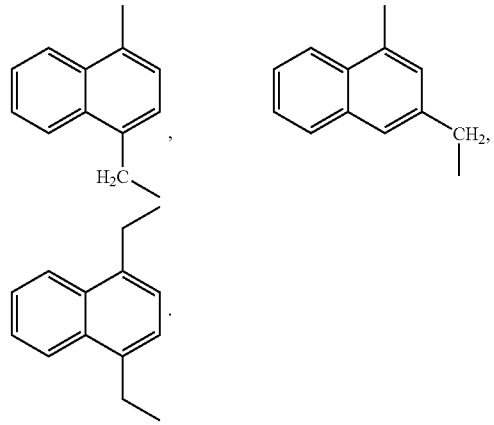

Examples of cycloalkylene are 1,2-cyclopentylene, 1,3-cyclopentylene, 1,2-cyclohexylene, 1,3-cyclohexylene and 1,4-cyclohexylene.

Halogen is fluorine, chlorine, bromine or iodine.

Preference is given to azo dyes of formula I, II or III wherein $R_3$ is —CN and $R_4$ is methyl.

Preference is given also to azo dyes of formula I, II or III wherein $R_1$ and $R_2$ are $C_2$–$C_8$-alkylene, $C_6$–$C_{14}$arylene or $C_8$–$C_{22}$aralkylene.

Special preference is given to azo dyes of formula I, II or III wherein $R_1$ and $R_2$ are each a group of formula IV (IV)

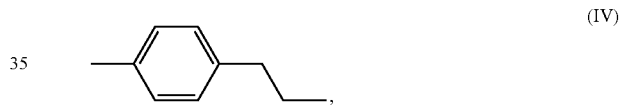

XH being bonded to the alkylene group and X being —O—.

$R_5$, $R_6$, $R_7$ and $R_8$ are preferably hydrogen, chlorine or bromine and especially hydrogen.

An especially preferred azo dye of formula I is the compound of formula Ia (Ia)

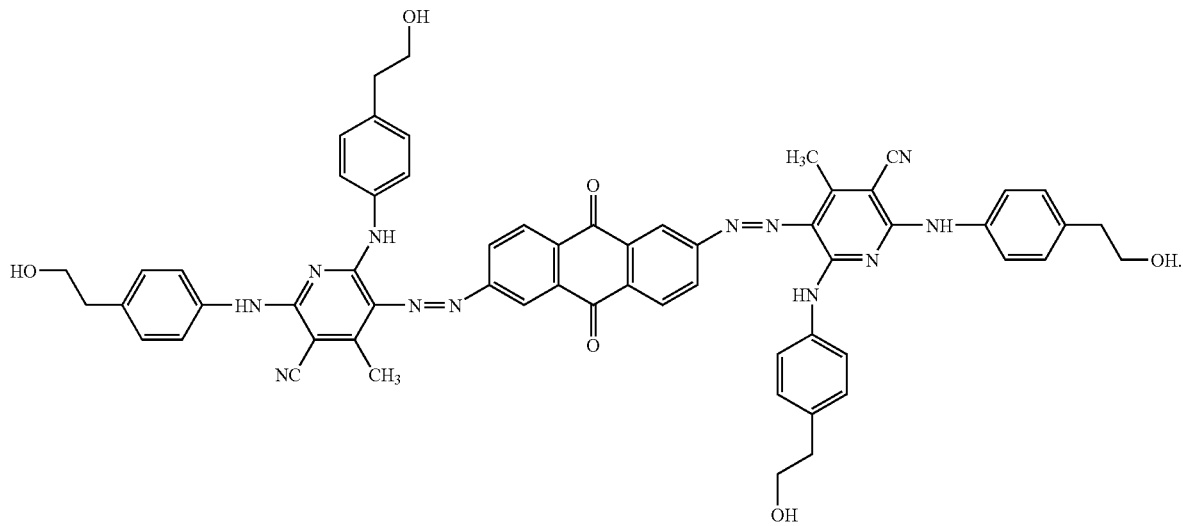

The compounds of formula I, II or III can be prepared according to known methods, for example by diazotization of diaminoanthraquinone or aminoanthraquinone and a subsequent coupling reaction.

The invention relates also to a process for the preparation of an azo dye of formula I, II or III which comprises diazotizing an anthraquinone compound of formula V, VI or VII

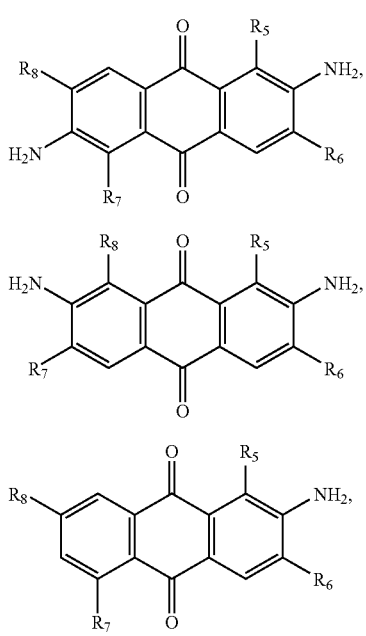

wherein $R_5$, $R_6$, $R_7$ and $R_8$ are as defined hereinabove,
in accordance with a conventional method, and then coupling to a coupling component of formula VIII

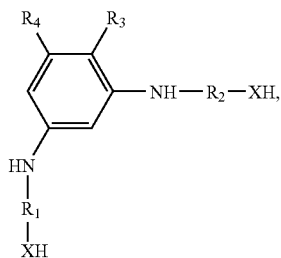

wherein $R_1$, $R_2$, $R_3$, $R_4$ and X are as defined hereinabove.

The diazotization of the diaminoanthraquinone compound or aminoanthraquinone compound is carried out in a manner known per se, for example using nitrosylsulfuric acid in an aqueous acidic medium, for example an aqueous hydrochloric acid medium or aqueous sulfuric acid medium. The diazotization can, however, also be carried out using other diazotizing agents, for example sodium nitrite. An additional acid may be present in the reaction medium in the diazotization procedure, e.g. phosphoric acid, sulfuric acid, acetic acid, propionic acid, hydrochloric acid or a mixture of such acids, for example a mixture of propionic acid and acetic acid. The diazotization is advantageously carried out at temperatures from −10 to +30° C., e.g. from 0° C. to room temperature.

Coupling of the diazotized anthraquinone derivative to the coupling component of formula VIII is likewise carried out in known manner, for example in an acidic, aqueous or aqueous-organic, medium, advantageously at temperatures from −10 to 30° C., especially below 10° C. The acid used may be, for example, hydrochloric acid, acetic acid, propionic acid, sulfuric acid or phosphoric acid.

The coupling components of formula VIII are known or can be prepared in a manner known per se, for example by reacting a 2,6-dichloropyridine derivative of formula IX

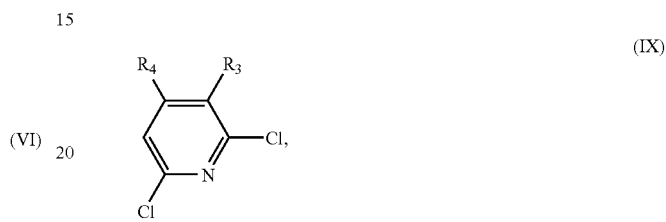

wherein $R_3$ and $R_4$ are as defined hereinabove,
simultaneously or in succession, with an amine of formula X and an amine of formula XI $$HX-R_1-NH_2 \quad (X),$$

$$HX-R_2-NH_2 \quad (XI),$$

wherein $R_1$ and $R_2$ are as defined hereinabove.

The compounds of formula IX and the amines of formulae X and XI are known and can be prepared in a manner known per se.

The invention relates also to a method of producing coloured plastics or polymeric colour particles which comprises mixing a high molecular weight organic material with a tinctorially effective amount of at least one azo dye of formula I, II or III.

The colouring of the high molecular weight organic substances using an azo dye of formula I, II or III can be carried out, for example, by using roll mills, mixing apparatus or grinding apparatus to admix such a dye with such substrates, the dye being dissolved or finely distributed in the high molecular weight material. The high molecular weight organic material with the admixed dye is then processed according to methods known per se, such as, for example, calendering, compression moulding, extrusion, coating, spinning, pouring or injection moulding, as a result of which the coloured material acquires its final form. Admixture of the dye can also be effected immediately prior to the actual processing step, for example by simultaneously continuously feeding, directly into the intake zone of an extruder, a solid, for example pulverulent, dye and a granulated or pulverulent high molecular weight organic material and, where appropriate, also other ingredients, such as additives, the constituents being mixed in just before being processed. Generally, however, preference is given to mixing the dye into the high molecular weight organic material beforehand, since more uniformly coloured substrates can be obtained.

In order to produce non-rigid shaped articles or to reduce their brittleness, it is frequently desirable to incorporate so-called plasticisers into the high molecular weight compounds prior to shaping. There may be used as plasticisers, for example, esters of phosphoric acid, phthalic acid or sebacic acid. In the method according to the invention, the plasticisers can be incorporated into the polymers before or after the incorporation of the colorant. It is also possible, in order to achieve different colour shades, to add to the high molecular weight organic substances, in addition to the azo dye of formula I, II or III, also other pigments or other colorants in the desired amounts, optionally together with further additives, for example fillers or siccatives.

Preference is given to the colouring of thermoplastic plastics especially in the form of fibres. Preferred high molecular weight organic materials that can be coloured in accordance with the invention are very generally polymers having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) or acrylonitrile/butadiene/styrene (ABS). Polyester and polyamide are especially preferred. More especially preferred are linear aromatic polyesters, which can be obtained by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBT); also polycarbonates, e.g. those obtained from α,α-dimethyl-4,4-dihydroxy-diphenylmethane and phosgene, or polymers based on polyvinyl chloride and also on polyamide, for example polyamide 6 or polyamide 6.6.

Since the compounds of formulae I, II and III according to the invention contain at least 4 active H atoms (two NH and two XH groups), mixing the dye with the monomers and incorporation thereof in the form of a comonomer directly into the polymer skeleton is possible, provided that the monomers contain reactive groups that react with the active hydrogen atoms of the NH or OH groups. Examples of such monomers include epoxides (epoxy resins), isocyanates (polyurethanes) and carboxylic acid chlorides (polyamides, polyesters).

The invention accordingly relates also to a method of producing coloured plastics or polymeric colour particles that comprises causing a mixture comprising at least one monomer that contains at least one NH- or OH-reactive group and is capable of polymerisation, polyaddition or polycondensation reactions to react with at least one compound of formula I, II or III.

The present invention relates also to the use of compounds of formula I, II or III in the production of mass-coloured plastics or polymeric colour particles and to the plastics and polymeric colour particles coloured using the compounds of formula I, II or III.

The dyes according to the invention impart to the above-mentioned materials, especially polyester materials, level colour shades of high tinctorial strength that have good in-use fastness properties, especially very good high-temperature light fastness.

The dyes according to the invention can also readily be used together with other dyes to produce blended shades.

The azo dyes of formulae I, II and III according to the invention are furthermore suitable as colorants in the production of colour filters, especially for visible light in the range from 400 to 700 nm, for liquid crystal displays (LCDs) or charge combined devices (CCDs).

The production of colour filters by sequential application of a red, blue and green colorant to a suitable substrate, for example amorphous silicon, is described in GB-A 2 182 165. The colour filters can be coated, for example, using inks, especially printing inks, that comprise the azo dyes according to the invention, or can be produced, for example, by blending the azo dyes according to the invention with chemically, thermally or photolytically structurable high molecular weight material. The further production can be carried out, for example, analogously to EP-A 654 711 by application to a substrate, such as an LCD, followed by photo-structuring and development. Other documents that describe the production of colour filters include U.S. Pat. No. 5,624,467, Displays 14/2, 115 (1993) and WO 98/45756.

The colour filters that are produced for liquid crystal displays (LCDs) using the azo dyes according to the invention are distinguished by high transmission of colour dots.

The invention relates also to the use of an azo dye according to the invention as a colorant in the production of colour filters.

The following Examples serve to illustrate the invention.

I. PREPARATION EXAMPLES

I.1 Compound of formula Ia (Ia)

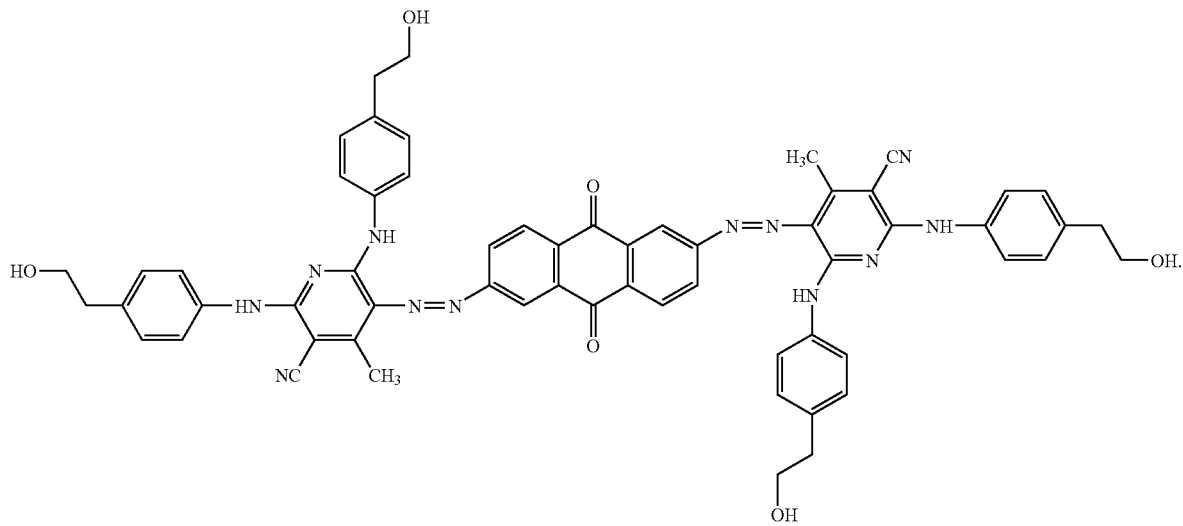

A. Synthesis of 2,6-bis[4-(2-hydroxyethyl)phenylamino]-3-cyano-4-methylpyridine 495.0 g of 2-(4-aminophenyl)-ethanol are introduced into a plane-ground flask and heated to 140° C. There are introduced into the melt, at 120–140° C., first 255.8 g of sodium carbonate and then 190.8 g of 2,6-dichloro-3-cyano-4-methylpyridine. The reaction mixture is stirred for 18 hours at 190–195° C., and then added in portions to 1 litre of 2N hydrochloric acid and left to stand overnight. The precipitate is filtered off, washed and dried in a vacuum drying cabinet.

Yield: 380.8 g (98%)

B. Diazotization with 2,6-diaminoanthraquinone 14.4 g of 2,6-diaminoanthraquinone are introduced into 75 ml of concentrated sulfuric acid in the course of 10 min. so that the temperature of the mixture does not exceed 40° C. After stirring for 30 min. at RT, 21.6 ml of 40% nitrosylsulfuric acid are slowly added dropwise in such a manner that the temperature is 22–25° C. (approx. 20 min.). The mixture is then stirred for 4 hours at RT, a brown solution of the diazonium salt being obtained.

1.5 litres of glacial acetic acid are introduced, as the initial charge, into a 6 litre glass beaker equipped with a pH meter; with stirring, 48 g of 2,6-bis[4-(2-hydroxyethyl)phenylamino]-3-cyano-4-methylpyridine are introduced. After the addition of 750 ml of ice-water, the solution of the diazonium salt is added dropwise in the course of about 10 min. The pH is adjusted to 0.25 by adding 240 ml of 30% sodium hydroxide solution; the temperature of the reaction mixture is not to exceed 35° C. in the course of that addition. The solution is then stirred for 4 hours at 45–50° C. and overnight at RT. The precipitate is filtered off, washed with 80% acetic acid, water, dimethylformamide (DMF) and again with water, and dried in a vacuum drying cabinet at 60–70° C.

Yield: 57.2 g (92%)

II. APPLICATION EXAMPLES

II.1. Production of a Colour Filter for Liquid Crystal Displays (LCDS)

In a 100 ml glass vessel containing 83.3 g of zirconium ceramic beads, 2.8 g of the azo dye according to Example I.1, 0.28 g of Solsperse® 5000, 4.10 g of Disperbyk® 161 (dispersing agent, 30% solution of a high molecular weight block copolymer, containing groups having affinity for the pigment, in n-butyl acetate/1-methoxy-2-propyl acetate 1:6, BYK Chemie) and 14.62 g of 1-methoxy-2-propyl acetate (MPA) are stirred at 23° C. for 10 minutes at 1000 rev/min. and for 180 minutes at 3000 rev/min. using a Dispermat. After the addition of 4.01 g of an acrylate polymer binder (35% solution in MPA), stirring is carried out at room temperature for 30 minutes at 3000 rev/min. Following removal of the beads, the dispersion is diluted with an equal weight of MPA.

Using a spin-coating apparatus, a glass substrate (Corning type 1737-F) is coated with the resulting dispersion and centrifuged for 30 seconds at 1000 rev/min. The layer is dried on a hot plate for 2 minutes at 100° C. and for 5 minutes at 200° C. The resulting layer thickness is 0.4 μm.

The following azo dyes (Tables 1–15), which are likewise suitable for mass-colouring plastics, can be prepared analogously to Example I.1:

TABLE 1

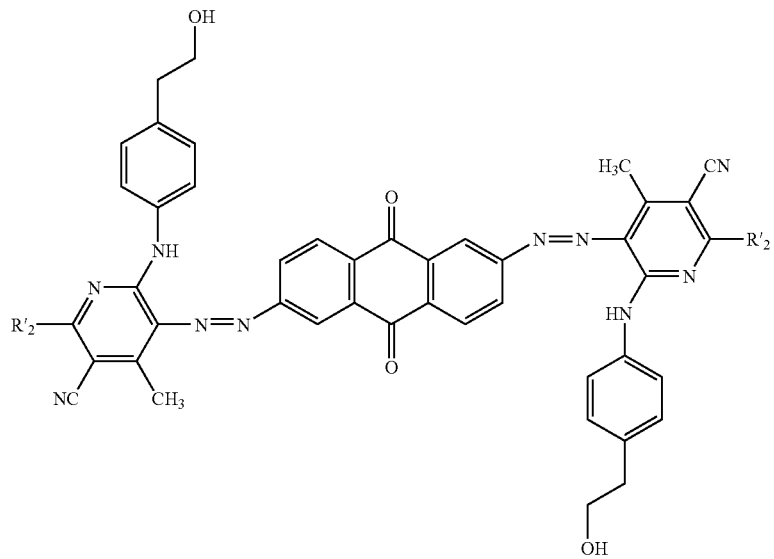

R'$_2$ = —NH—(CH$_2$CH$_2$)—OH,
—NH—(CH$_2$CH$_2$)—O—(CH$_2$CH$_2$)—OH,
—NH—CH$_2$—CHOH—CH$_2$—OH,
—NH—(CH$_2$CH$_2$)—S—(CH$_2$CH$_2$)—OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$,

TABLE 1-continued
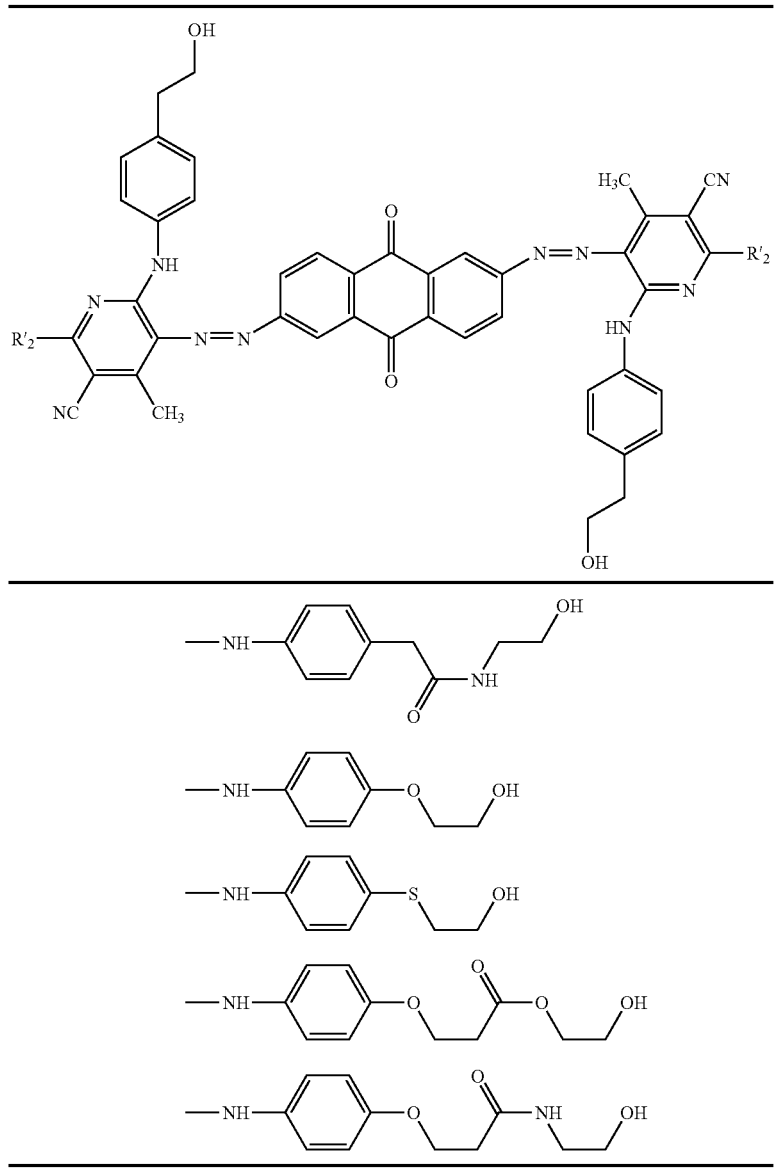
TABLE 2
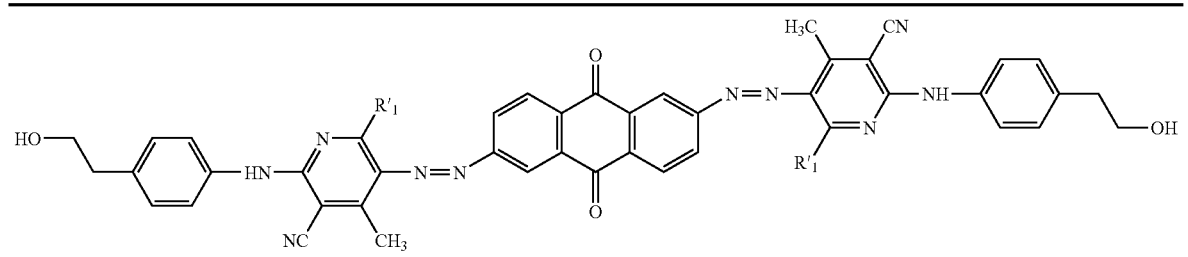
R'₁ = —NH—(CH₂CH₂)—OH,
—NH—(CH₂CH₂)—O—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂, TABLE 2-continued
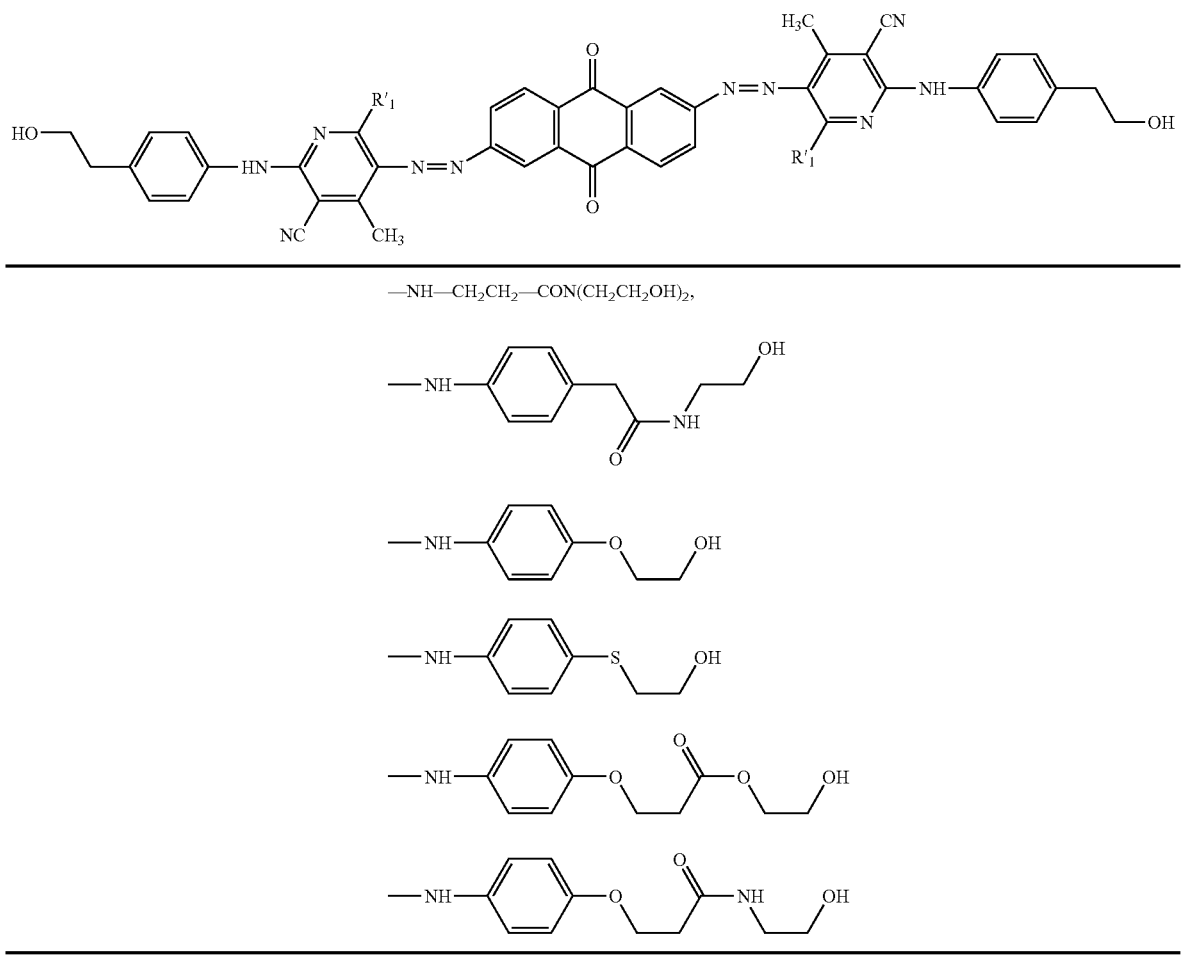
—NH—CH$_2$CH$_2$—CON(CH$_2$CH$_2$OH)$_2$,
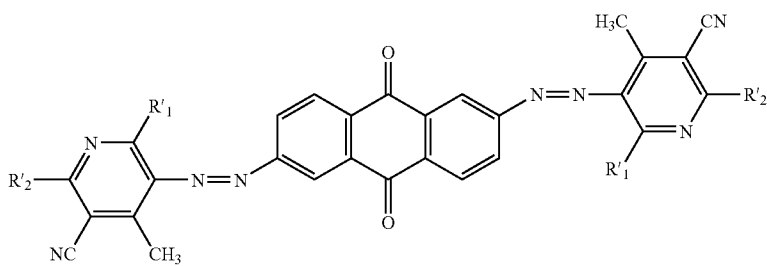
TABLE 3
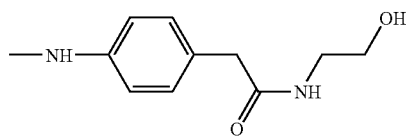
R$_1$' = R$_2$' = —NH—(CH$_2$CH$_2$)—OH,
—NH—(CH$_2$CH$_2$)—O—(CH$_2$CH$_2$)—OH,
—NH—CH$_2$—CHOH—CH$_2$—OH,
—NH—(CH$_2$CH$_2$)—S—(CH$_2$CH$_2$)—OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$, TABLE 3-continued
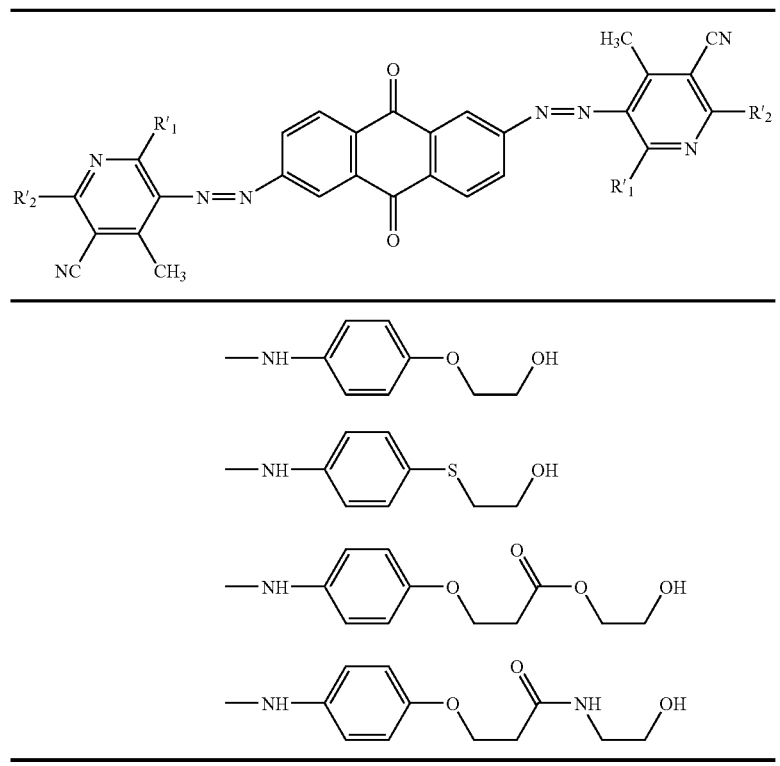
TABLE 4
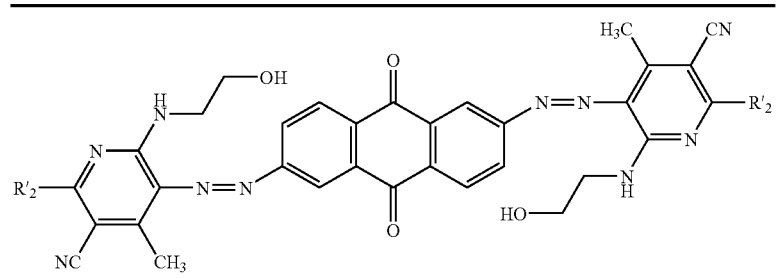
R'$_2$ = —NH—(CH$_2$CH$_2$)—OH,
—NH—(CH$_2$CH$_2$)—O—(CH$_2$CH$_2$)—OH,
—NH—CH$_2$—CHOH—CH$_2$—OH,
—NH—(CH$_2$CH$_2$)—S—(CH$_2$CH$_2$)—OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$,
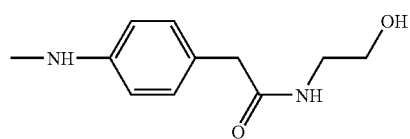
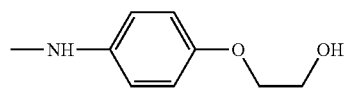
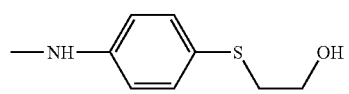

TABLE 4-continued
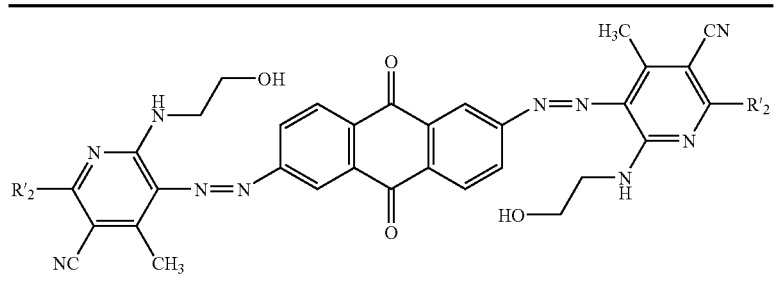
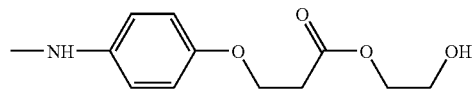
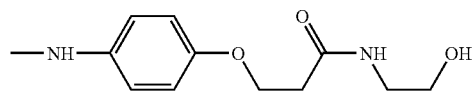
TABLE 5
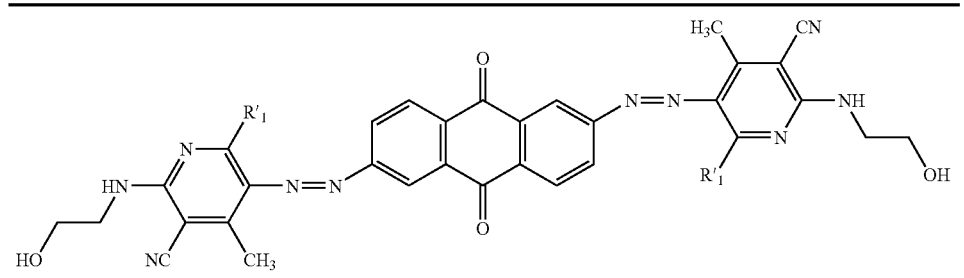
R'$_1$ = —NH—(CH$_2$CH$_2$)—OH,
—NH—(CH$_2$CH$_2$)—O—(CH$_2$CH$_2$)—OH,
—NH—CH$_2$—CHOH—CH$_2$—OH,
—NH—(CH$_2$CH$_2$)—S—(CH$_2$CH$_2$)—OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$,
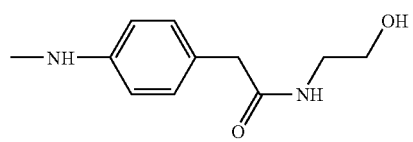
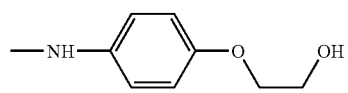
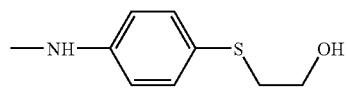
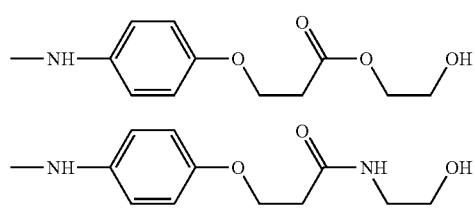

TABLE 6
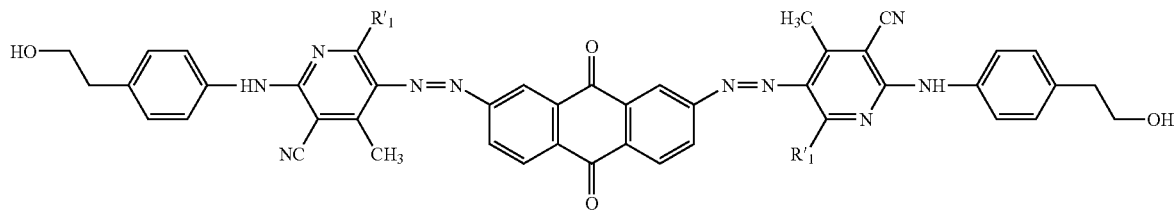
R'₁ = —NH—(CH₂CH₂)—OH,
—NH—(CH₂CH₂)—O—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,
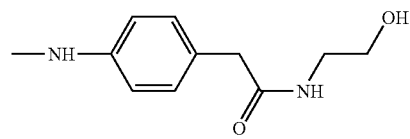
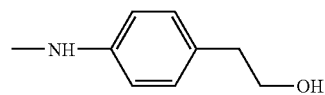
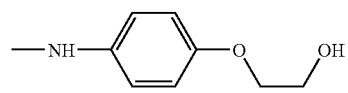
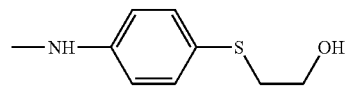
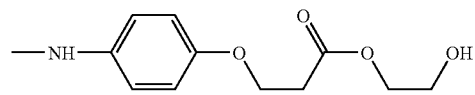
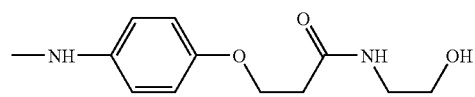

TABLE 7
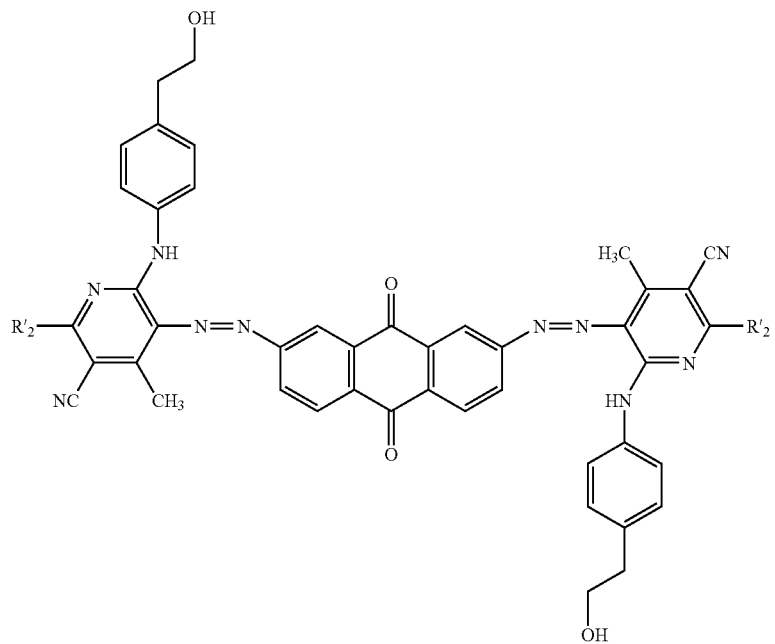
R'₂ =  —NH—(CH₂CH₂)—OH,
—NH—(CH₂CH₂)—O—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,
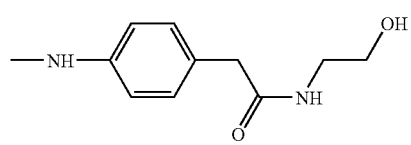
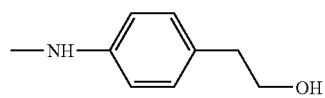
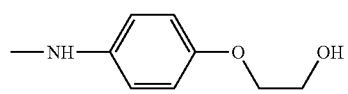
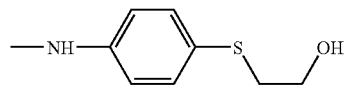
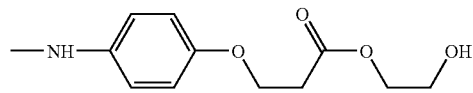
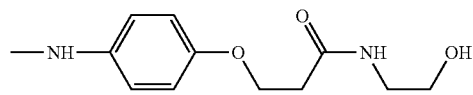

TABLE 8

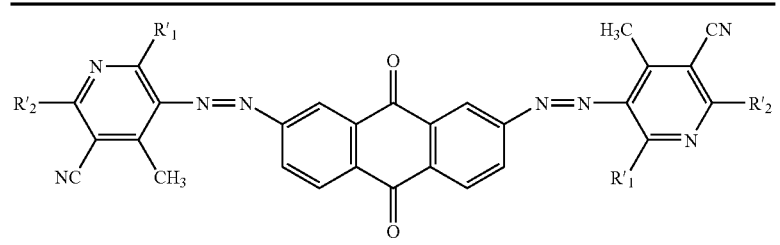

R'₁ = R'₂ = —NH—(CH₂CH₂)—OH,
—NH—(CH₂CH₂)—O—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

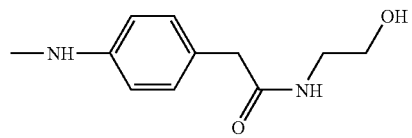

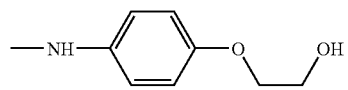

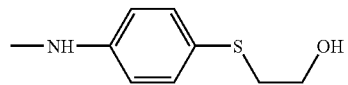

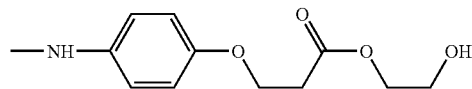

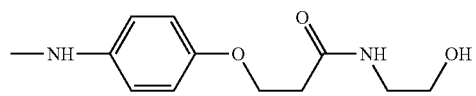

TABLE 9

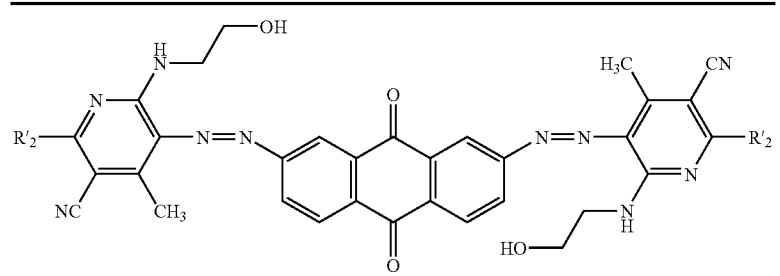

R'₂ = —NH—(CH₂CH₂)—OH,
—NH—(CH₂CH₂)—O—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

TABLE 9-continued
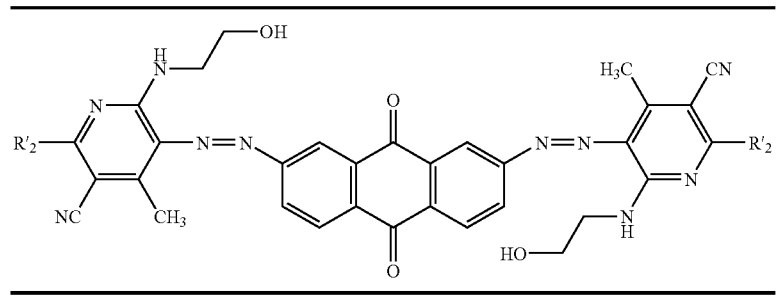
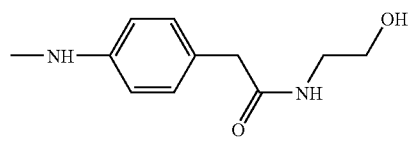
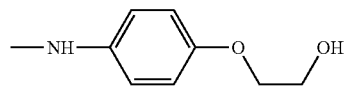
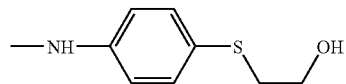
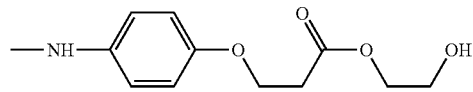
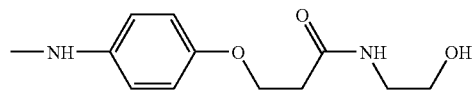
TABLE 10
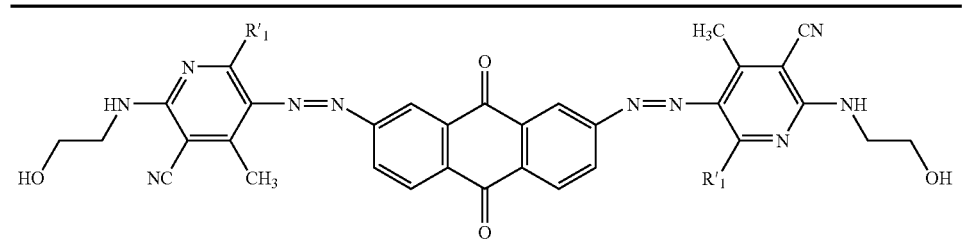
$R'_1$ = —NH—($CH_2CH_2$)—OH,
—NH—($CH_2CH_2$)—O—($CH_2CH_2$)—OH,
—NH—$CH_2$—CHOH—$CH_2$—OH,
—NH—($CH_2CH_2$)—S—($CH_2CH_2$)—OH,
—NH—($CH_2CH_2$)—NH—($CH_2CH_2$)—OH,
—NH—($CH_2CH_2$)—$NH_2$,
—NH—$CH_2$—CHOH—$CH_2$—$NH_2$,
—NH—$CH_2$—CON($CH_2CH_2OH)_2$,
—NH—$CH_2CH_2$—CON($CH_2CH_2OH)_2$,
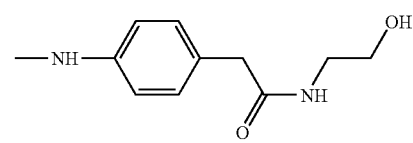
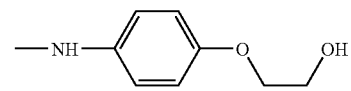

TABLE 10-continued
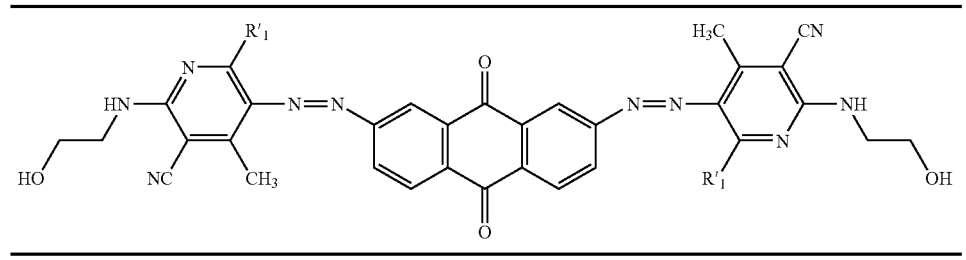
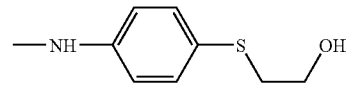
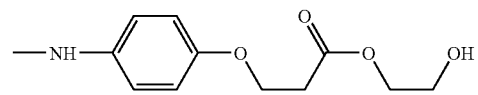
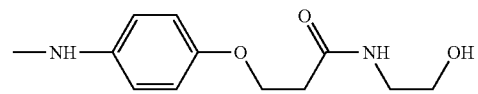
TABLE 11
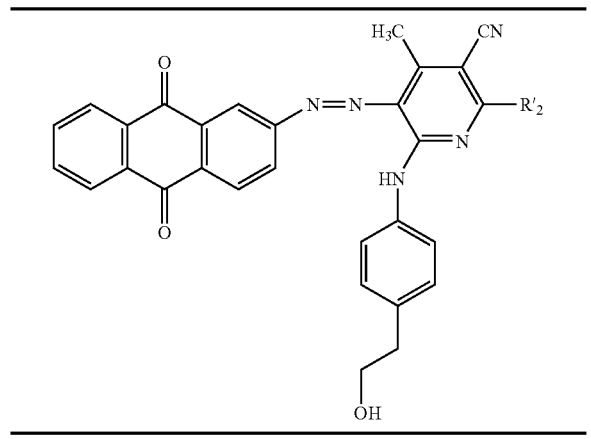
R'₂ = —NH—(CH₂CH₂)—OH,
—NH—(CH₂CH₂)—O—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,
TABLE 11-continued
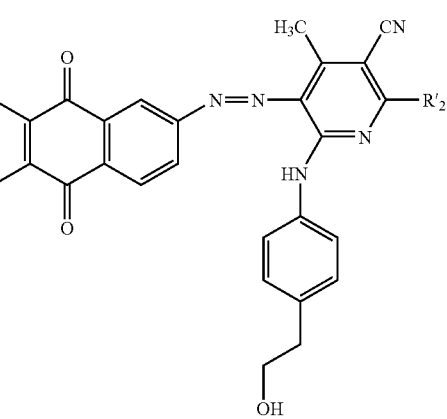
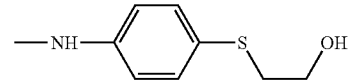
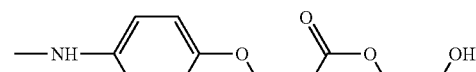
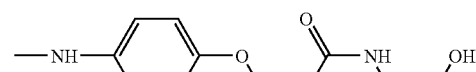

TABLE 12

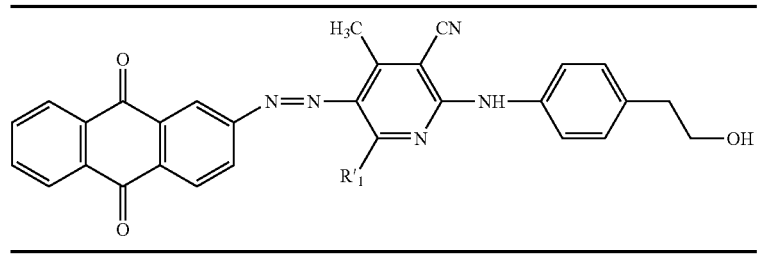

R'₁ = —NH—(CH₂CH₂)—OH,
—NH—(CH₂CH₂)—O—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

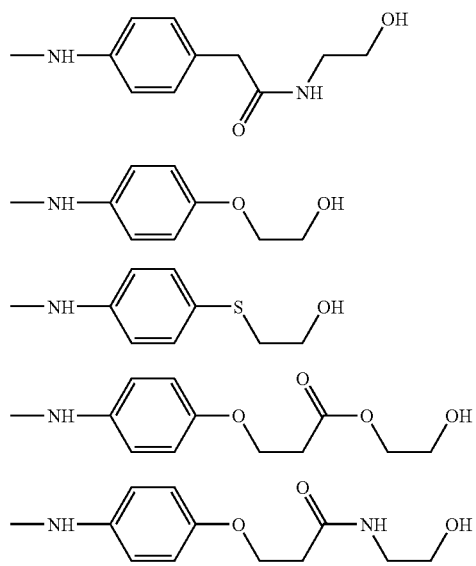

TABLE 13

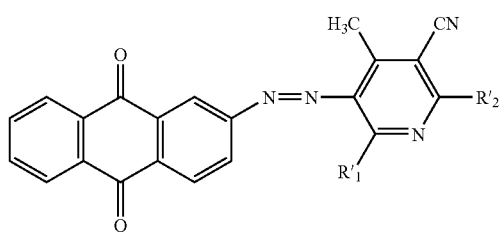

R₁' = R'₂ = —NH—(CH₂CH₂)—OH,
—NH—(CH₂CH₂)—O—(CH₂CH₂)—OH,
—NH—CH₂—CHOH—CH₂—OH,
—NH—(CH₂CH₂)—S—(CH₂CH₂)—OH,
—NH—(CH₂CH₂)—NH—(CH₂CH₂)—OH,
—NH—(CH₂CH₂)—NH₂,
—NH—CH₂—CHOH—CH₂—NH₂,
—NH—CH₂—CON(CH₂CH₂OH)₂,
—NH—CH₂CH₂—CON(CH₂CH₂OH)₂,

TABLE 13-continued

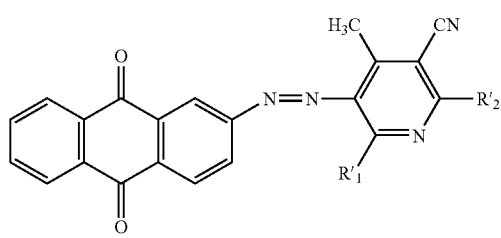

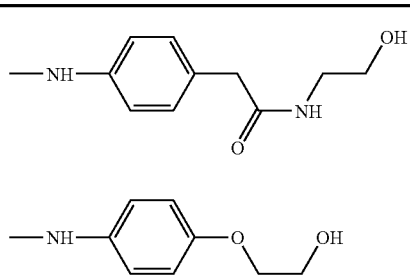

TABLE 13-continued

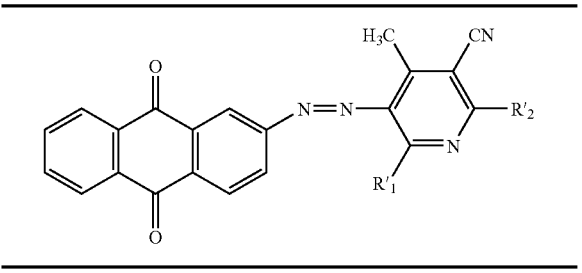

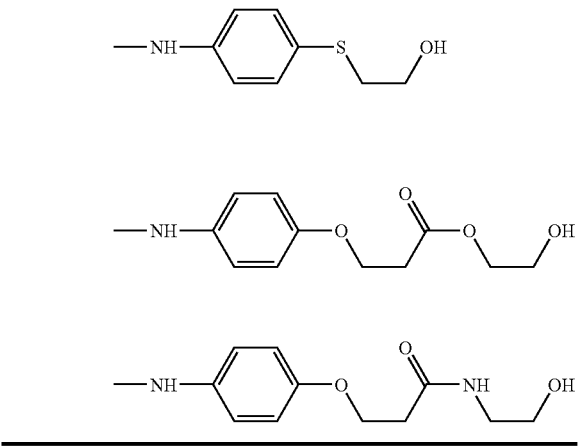

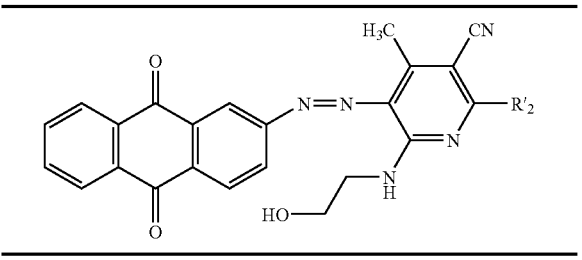

TABLE 14

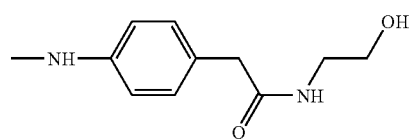

R'$_2$ = —NH—(CH$_2$CH$_2$)—OH,
—NH—(CH$_2$CH$_2$)—O—(CH$_2$CH$_2$)—OH,
—NH—CH$_2$—CHOH—CH$_2$—OH,
—NH—(CH$_2$CH$_2$)—S—(CH$_2$CH$_2$)—OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$,

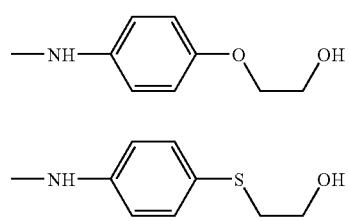

TABLE 14-continued

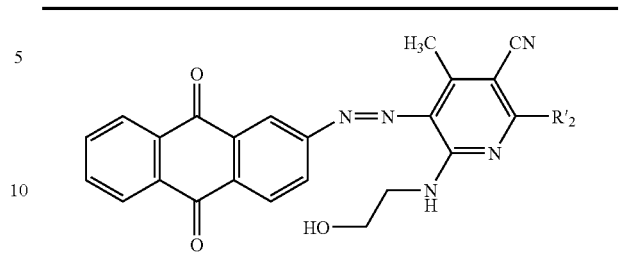

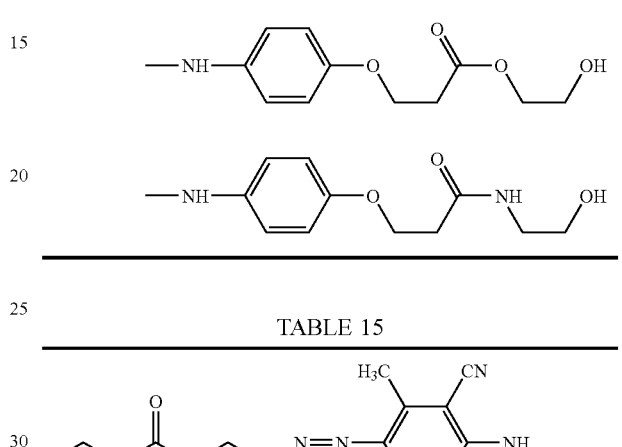

TABLE 15

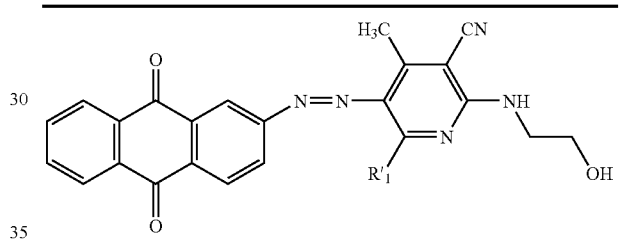

R'$_1$ = —NH—(CH$_2$CH$_2$)—OH,
—NH—(CH$_2$CH$_2$)—O—(CH$_2$CH$_2$)—OH,
—NH—CH$_2$—CHOH—CH$_2$—OH,
—NH—(CH$_2$CH$_2$)—S—(CH$_2$CH$_2$)—OH,
—NH—(CH$_2$CH$_2$)—NH—(CH$_2$CH$_2$)—OH,
—NH—(CH$_2$CH$_2$)—NH$_2$,
—NH—CH$_2$—CHOH—CH$_2$—NH$_2$,
—NH—CH$_2$—CON(CH$_2$CH$_2$OH)$_2$,
—NH—CH$_2$CH$_2$—CON(CH$_2$CH$_2$OH)$_2$,

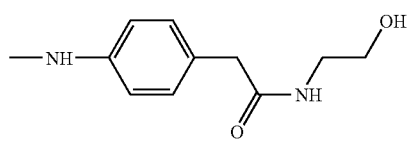

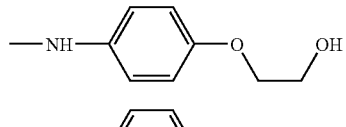

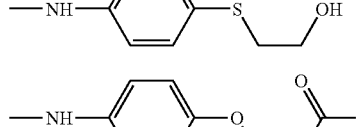

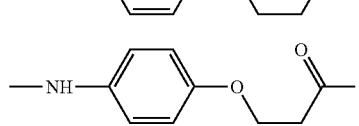

What is claimed is:

1. An azo dye of formula I, II or III

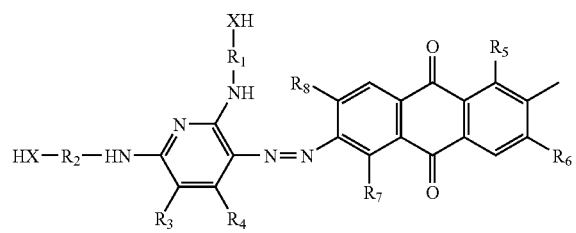
(I)

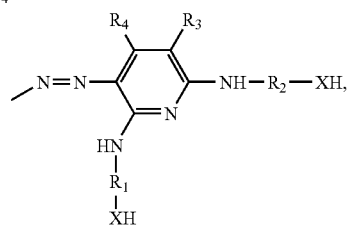
(II)

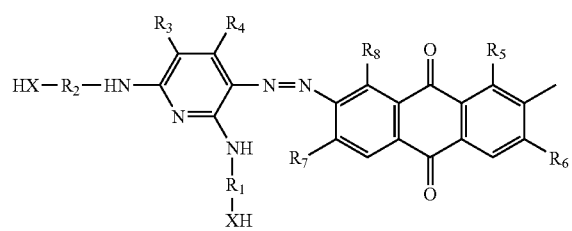

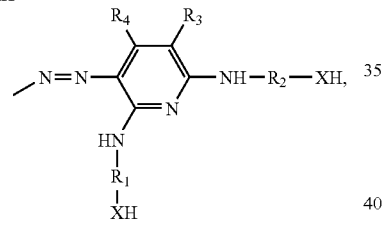

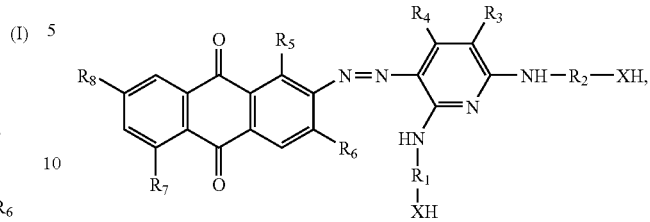
(III)

wherein $R_1$ and $R_2$ are each independently of the other one or more divalent groups selected from alkylene, arylene, aralkylene and cycloalkylene, which may be interrupted by —O—, —S—, —NH—, —$NR_8$—, —COO—, —CONH— or —$CONR_9$—, wherein $R_8$ and $R_9$ are alkyl or aryl, X is —O— or —NH—, $R_3$ is —CN or —$CONH_2$, $R_4$ is methyl or trifluoromethyl and $R_5$, $R_6$, $R_7$ and $R_8$ are each independently of the others hydrogen, halogen or —CN.

2. An azo dye of formula I, II or III according to claim 1, wherein $R_3$ is —CN and $R_4$ is methyl.

3. An azo dye of formula I, II or III according to claim 1, wherein $R_1$ and $R_2$ are $C_2$–$C_8$alkylene, $C_6$–$C_{14}$arylene or $C_8$–$C_{22}$aralkylene.

4. An azo dye of formula I, II or III according to claim 1, wherein $R_1$ and $R_2$ are a group of formula IV

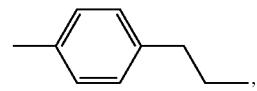
(IV)

XH being bonded to the alkylene group and X being —O—.

5. The azo dye of formula Ia according to claim 1

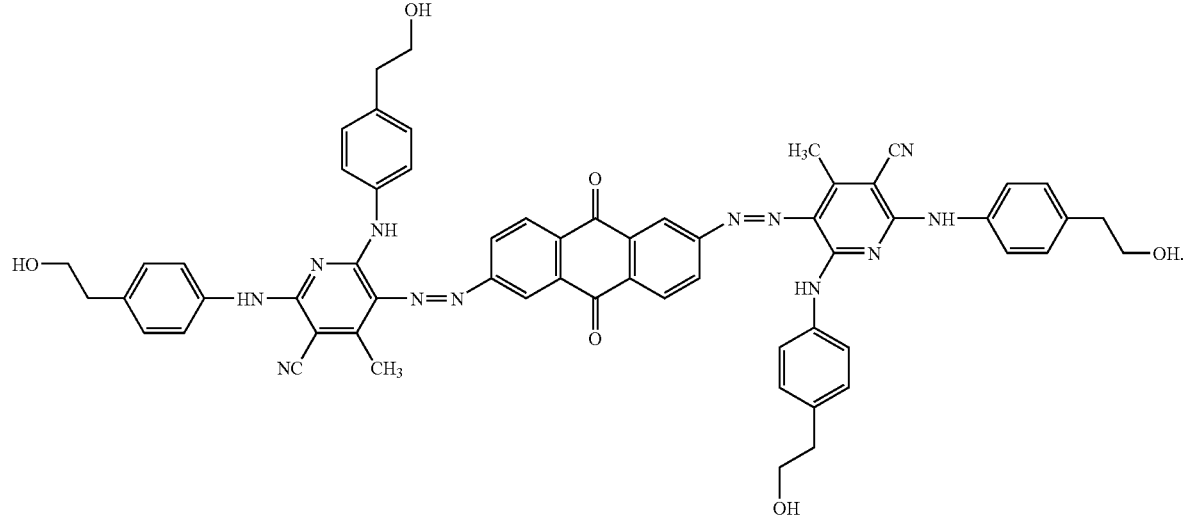
(Ia)

6. A process for the preparation of an azo dye of formula I, II or III according to claim 1, which comprises diazotizing an anthraquinone compound of formula V, VI or VII

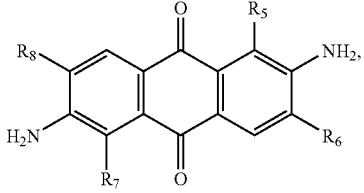
(V)

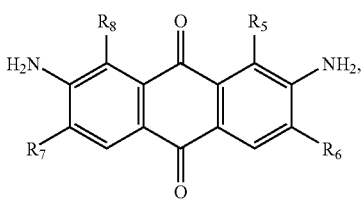
(VI)

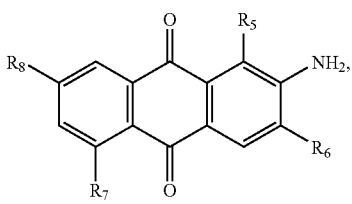
(VII)

wherein $R_5$, $R_6$, $R_7$ and $R_8$ are as defined in claim 1, in accordance with a conventional method, and then coupling to a coupling component of formula VIII

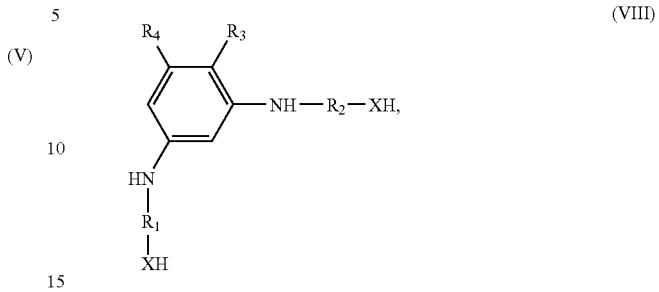
(VIII)

wherein $R_1$, $R_2$, $R_3$, $R_4$ and X are as defined in claim 1.

7. A method of producing coloured plastics or polymeric colour particles that comprises mixing a high molecular weight organic material with a tinctorially effective amount of at least one azo dye of formula I, II or III according to claim 1.

8. A method of producing coloured plastics or polymeric colour particles that comprises causing a mixture comprising at least one monomer that contains at least one NH- or OH-reactive group and is capable of polymerisation, polyaddition or polycondensation reactions to react with at least one compound of formula I, II or III according to claim 1.

9. Plastics or polymeric colour particles coloured in accordance with a method according to claim 7.

10. Plastics or polymeric colour particles coloured in accordance with a method according to claim 8.

11. A method of producing colour filters that comprises coating a substrate with a high molecular weight organic material that contains a tinctorially effective amount of at least one compound of formula I, II or III according to claim 1.

* * * * *